(12) United States Patent
Ford et al.

(10) Patent No.: US 12,165,784 B2
(45) Date of Patent: Dec. 10, 2024

(54) METHOD FOR INJECTING STRAND-BLOCKED CABLE

(71) Applicant: Novinium, LLC, Kent, WA (US)

(72) Inventors: Weston Philips Chapin Ford, Seattle, WA (US); Norman E. Keitges, Renton, WA (US); James Steele, Seattle, WA (US)

(73) Assignee: NOVINIUM, LLC, Kent, WA (US)

( * ) Notice: Subject to any disclaimer, the term of this patent is extended or adjusted under 35 U.S.C. 154(b) by 295 days.

(21) Appl. No.: 17/459,867

(22) Filed: Aug. 27, 2021

(65) Prior Publication Data
US 2022/0375655 A1 Nov. 24, 2022

Related U.S. Application Data

(60) Provisional application No. 63/191,883, filed on May 21, 2021.

(51) Int. Cl.
| | |
|---|---|
| *H01B 13/32* | (2006.01) |
| *H01B 19/02* | (2006.01) |
| *B05D 3/04* | (2006.01) |
| *B05D 7/20* | (2006.01) |

(52) U.S. Cl.
CPC .......... *H01B 13/322* (2013.01); *H01B 19/02* (2013.01); *B05D 3/0466* (2013.01); *B05D 7/20* (2013.01); *B05D 2256/00* (2013.01); *H01B 13/324* (2013.01)

(58) Field of Classification Search
CPC .... H01B 13/32; H01B 13/322; H01B 13/324; H01B 19/02; B05D 3/0466; B05D 7/20; B05D 2256/00

USPC ......................................................... 427/117
See application file for complete search history.

(56) References Cited

U.S. PATENT DOCUMENTS

| | | | |
|---|---|---|---|
| 2,106,445 A * | 1/1938 | Wade | H01B 13/30 156/51 |
| 3,014,139 A | 12/1961 | Shildneck | |
| 3,943,271 A | 3/1976 | Bahder et al. | |
| 4,095,039 A | 6/1978 | Thompson | |
| 4,372,988 A * | 2/1983 | Bahder | H01B 7/2813 156/48 |
| 4,545,133 A * | 10/1985 | Fryszczyn | H02G 1/14 34/442 |
| 4,703,132 A | 10/1987 | Marciano-Agostinelli et al. | |

(Continued)

OTHER PUBLICATIONS

Banerjee, et al., "Gable Rejuvenalion Practices", CEATI International Report No. T154700-50/129, Nov. 2017, 1 page.

(Continued)

*Primary Examiner* — Brian K Talbot
(74) *Attorney, Agent, or Firm* — Davis Wright Tremaine LLP; George C. Rondeau, Jr.

(57) ABSTRACT

A method for rejuvenating a strand-blocked cable having a conductor comprised of a plurality of conductor strands with interstitial volume therebetween blocked by a PIB based strand-block mastic, the conductor being surrounded by a polymeric cable insulation. The method including pre-injection of compressed gas into the conductor strands of the cable at a pressure less than the elastic limit of the cable insulation, and injection of a rejuvenation fluid into the conductor strands of the cable at a pressure less than the elastic limit of the cable insulation.

17 Claims, 13 Drawing Sheets

(56) References Cited

U.S. PATENT DOCUMENTS

| | | | |
|---|---|---|---|
| 4,766,011 A * | 8/1988 | Vincent | H01B 3/441 427/140 |
| 4,874,442 A * | 10/1989 | Watkins | H01B 13/327 156/48 |
| 4,946,393 A | 8/1990 | Borgstrom et al. | |
| 4,963,695 A | 10/1990 | Marciano-Agostinelli et al. | |
| 5,049,593 A | 9/1991 | Marciano-Agostinelli et al. | |
| 5,372,841 A | 12/1994 | Kleyer et al. | |
| 5,481,635 A * | 1/1996 | Arroyo | H01B 7/288 385/103 |
| 6,331,353 B1 * | 12/2001 | Foulger | H01B 7/285 174/120 SR |
| 6,350,947 B1 * | 2/2002 | Bertini | H01B 7/2813 174/47 |
| 6,355,879 B1 | 3/2002 | Bertini et al. | |
| 6,697,712 B1 | 2/2004 | Bertini et al. | |
| 7,195,504 B2 | 3/2007 | Bertini et al. | |
| 7,344,396 B2 | 3/2008 | Stagi et al. | |
| 7,544,105 B2 | 6/2009 | Stagi et al. | |
| 7,611,748 B2 | 11/2009 | Bertini | |
| 7,615,247 B2 | 11/2009 | Bertini et al. | |
| 7,621,767 B2 | 11/2009 | Stagi et al. | |
| 7,658,629 B2 | 2/2010 | Stagi et al. | |
| 7,658,808 B2 | 2/2010 | Bertini et al. | |
| 7,700,871 B2 | 4/2010 | Bertini et al. | |
| 7,777,131 B2 * | 8/2010 | Chatterton | H01B 7/288 174/25 P |
| 8,205,326 B2 | 6/2012 | Bertini et al. | |
| 8,572,842 B2 * | 11/2013 | Bertini | H01B 3/20 427/117 |
| 8,656,586 B2 * | 2/2014 | Bertini | H01B 7/285 29/857 |
| 2003/0226677 A1 | 12/2003 | Bertini et al. | |
| 2005/0192708 A1 | 9/2005 | Bertini | |
| 2008/0173467 A1 | 7/2008 | Bertini et al. | |
| 2009/0246995 A1 | 10/2009 | Stagi et al. | |
| 2010/0095521 A1 * | 4/2010 | Bertini | H01B 7/285 29/825 |
| 2010/0122453 A1 * | 5/2010 | Bertini | H01B 3/20 29/825 |
| 2011/0067238 A1 | 3/2011 | Martauz | |
| 2012/0102729 A1 * | 5/2012 | Bertini | H01B 7/285 29/825 |
| 2012/0285725 A1 * | 11/2012 | Maritano | H01B 3/52 174/120 FP |
| 2013/0220665 A1 * | 8/2013 | Wong | H01B 7/285 174/116 |
| 2017/0317476 A1 | 11/2017 | Bertini et al. | |
| 2020/0144796 A1 | 5/2020 | Bertini et al. | |
| 2020/0295545 A1 * | 9/2020 | Bertini | G08B 21/182 |
| 2021/0280341 A1 * | 9/2021 | Chatterton | H01B 7/2813 |
| 2022/0375656 A1 * | 11/2022 | Steele | H01B 13/322 |

OTHER PUBLICATIONS

IEEE Power & Energy Society, IEEE Std 1142-2009 "IEEE Guide for Selecling, Tesling, Applicalion, and Installation of Gables Having Radial Moisture Barriers and/or Longitudinal Water Blocking", Mar. 26, 2010, 71 pages.

Steenis, E.F. Water treeing the behavior of water trees in extruded cable insulation, Institutional Repository, Doctoral Thesis, Jun. 8, 1989, 197 pages.

International Search Report and Written Opinion for Application No. PCT/US2021/048096, mailed Dec. 16, 2021, filed Aug. 27, 2021, 10 pages.

Katz, "Laboratory Investigations Leading to Extending Service Life of Installed Extruded Dielectric Cables," Cable Technology Laboratories, 1986, 9 pages.

ANSI/ICEA T-31-610-2018 "Test Method for Conducting Longitudinal Water Penetration Resistance Tests on Blocked Conductors" by Insulated Gable Engineers Associalion, Inc., 2018, 13 pages.

IEEE, "IEEE Guide for the Selection, Testing, Application, and Installation of Cables having Radial-Moisture Barriers and/or Longitudinal Water Blocking," IEEE Std 1142-1995, Mar. 26, 2010, 72 pages.

International Search Report and Written Opinion for Application No. PCT/US2021/20902, mailed May 20, 2021, filed Mar. 4, 2021, 7 pages.

* cited by examiner

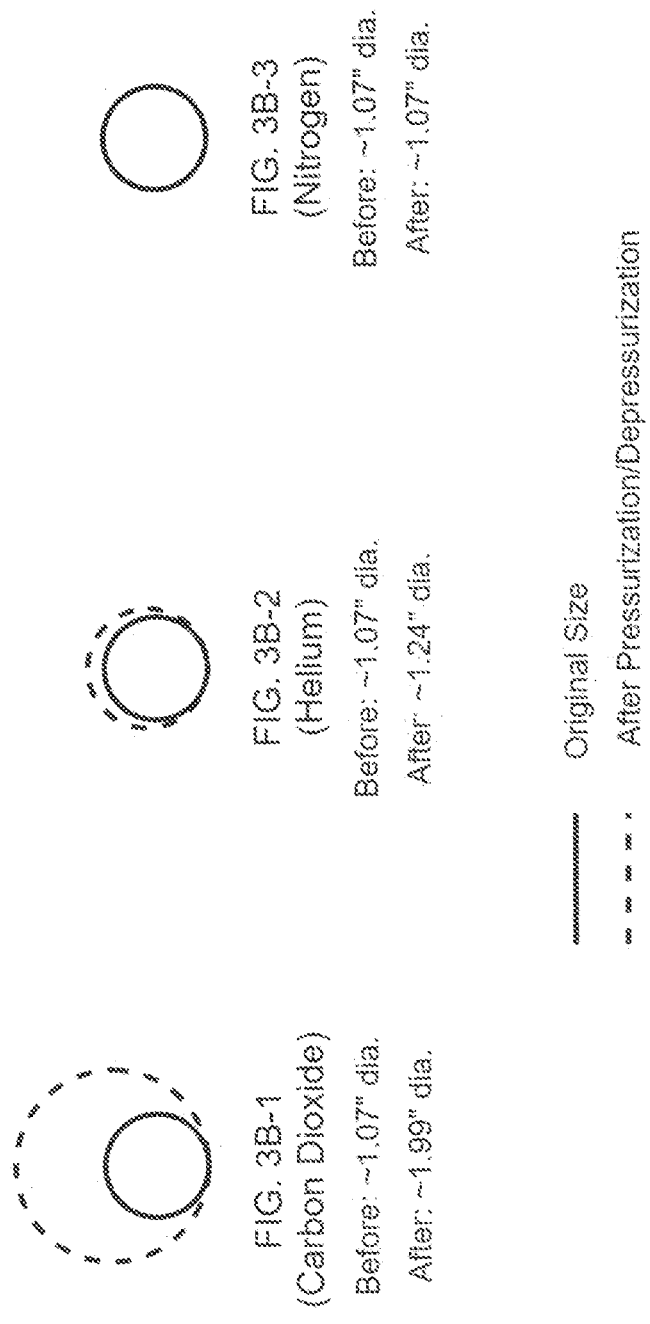

METHOD FOR INJECTING STRAND-BLOCKED CABLE

BACKGROUND OF THE INVENTION

Field of the Invention

The present invention relates to silane injection of solid dielectric medium-voltage power cables manufactured with primarily polyisobutylene (PIB) based longitudinal strand-blocked mastic between the conductor strands.

Description of the Related Art

Power Cable:

Power cables are generally constructed by a metallic conductor surrounded by polymeric insulation. For the purpose of illustration, a medium voltage power cable 100 is shown in FIG. 1. Typical construction for the medium voltage power cable 100 comprises a conductor 102 made of aluminum or copper. Often the conductor 102 will be comprised of multiple individual conductor strands 104 that are arranged in concentric layers. The space between the individual conductor strands is known as the interstitial volume 106. Surrounding the conductor is a conductor shield 108, a semi-conducting layer often included in the design of medium and high-voltage power cables to reduce electrical stress in the insulation. Surrounding the conductor or conductor shield is insulation 110 that has a substantial dielectric strength and is typically made of polyethylene (PE), cross-linked polyethylene (XLPE) or ethylene-propylene rubber (EPR). Surrounding the insulation 110 is an insulation shield 112, a second semi-conducting layer often included in medium and high-voltage power cables to reduce electrical stress in the insulation. Surrounding the insulation shield 112 is a ground 114 used to carry stray current and drain capacitive charge from the cable. The ground 114 may consist of multiple conductors arranged circumferentially around the cable called concentric neutrals 116. The outermost layer of the cable is the optional jacket 118 that provides mechanical protection to the cable. The construction of medium-voltage cable rated from 5 kV to 46 kV is further described in ICEA S-94-649-2000. While a medium voltage power cable with a jacketed concentric neutral construction has been shown, it should be appreciated that other forms of power cable exist, such as bare-concentric cable, tape-shield cable, low voltage cable, armored cable, submarine cable and high-voltage cable. Such cables may see the addition of elements such as armor or the subtraction of elements such as semi-conductive shields or neutrals.

Aging Mechanisms for MV Power Cables:

There are a number of phenomena that can "age" medium-voltage cable insulation. The most damaging of these is the diffusion of water from the ground through the jacket and insulation shield and into the insulation. Once in the insulation, the water can oxidize the PE, XLPE or EPR and result in a phenomenon known as water treeing occurring. [Steenis E. F. (1989) Water treeing the behavior of water trees in extruded cable insulation, 201p]. These water trees look like microscopic trees in the insulation, and they can grow from either of the two semi-conductive shields or can initiate within the insulation and grow radially towards the semi-conductive shields in the shape of a bowtie. Left untreated, these "water trees" grow in the insulation and lead to premature cable failure.

The life of the cable in the ground is directly related to the health of the insulation layer.

Rejuvenating Power Cables:

The space between the conductor strands is known as the interstitial region. First practiced in the 1980's, cable rejuvenation increases the cable insulation's dielectric strength by injecting water reactive alkoxysilanes into the interstitial region of the conductor [U.S. Pat. Nos. 7,615,247 and 7,611,748]. The fluid traverses from the near end of the cable to the far end of the cable. The fluid then diffuses radially from the interstitial region into the insulation. The fluid raises the dielectric strength of the insulation and reacts with water, effectively treating the water trees. As it reacts, the fluid becomes an oligomer decreasing its rate of diffusion by orders of magnitude, allowing the fluid to dwell in the cable for an extended period of time. Treating these water trees increases the remaining life of the cable by many years.

The typical injection process is as follows. The cable is de-energized and new terminations are placed on each end. The cable is checked for neutral condition and a slight positive flow of air is placed on the cable to ensure flow from one end of the cable to the other. The cable is then injected with the treatment fluid from the near end, and when the fluid arrives at the far end and fills the interstitial region, the cable is considered injected and is put back in service.

Cable Rejuvenation Methods:

Today, there are two primary methods of cable rejuvenation in commercial practice with both being well documented in literature [Banerjee, et al, "Cable Rejuvenation Practices", CEATI Report No. T154700-50/129, November 2017].

The first method known as improved un-sustained pressure rejuvenation (iUPR) relies on a continuous flow path being present in the conductor and uses it as the reservoir to house the injection treatment for treating the insulation. This method has been well described in literature, including U.S. Pat. Nos. 4,766,011 and 5,372,841.

The second method known as sustained pressure rejuvenation (SPR) creates additional interstitial volume through elastic expansion and increases flow rate due to the use of moderate pressure [U.S. Pat. Nos. 7,615,247 and 7,611,748].

Further improvement as disclosed in U.S. Pat. No. 8,572,842 includes the application of thermally enhanced rejuvenation (TER) to create interstitial volume through a combination of thermal expansion at an elevated temperature and elastic expansion due to a moderate pressure.

Strand Block Cables:

In the 1980's, cable manufacturers began incorporating strand-filling compounds into the conductors of medium voltage cable that filled the interstitial spaces and restricted water migrating along the length of cable. Strand blocking materials are a proprietary mixture for each manufacturer, but typical formulations will consist of polyisobutylene (PIB) and about 40-50% carbon black filler to help smooth the electrical field. Today, almost 90% of medium voltage cables manufactured are strand filled according to industry surveys. However, field experience shows strand blocked cables perform similarly to non-strand filled cables of like construction and vintage in terms of AC-breakdown performance and are still susceptible to water-tree aging and failures.

One of the unfortunate side effects of strand-blocking the conductor is that it renders the population of cable uninjectable by existing methods. The strand-blocking compound effectively fills the interstitial space of the cable's conductor and blocks the injection of rejuvenation fluids. Consequently, circuit owners must turn to cable replacement when strand-blocked cables age due to water trees and the AC breakdown strength of the cable drops to unacceptable levels. Today, after nearly 40 years of strand-blocked cable installation, there are billions of feet of strand-blocked cable in operation, the oldest of which is at or nearing its end of life. There is a need for a new injection process to address water trees in strand-blocked cable.

From the original Bander patent (U.S. Pat. No. 3,943,271) to modern concept (U.S. Pat. Nos. 4,095,039, 4,703,132, 4,963,695 and 6,331,353, for example), it has been known that keeping cables dry is the only way to ensure long cable life. Bander determined that water caused a shortening of life through the growth of water trees, as described above, and that water intrusion during manufacture or after the cable was buried leads to a reduction in cable life. This led to the adoption of jackets on cables to keep water out of the insulation and a strand blocked mastic in the conductor to impede water flow along the conductor. There had been many early attempts to impede water and many formulas of mastic employed to prevent flow of fluid down the interstitial region of the cable. Today, with few exceptions, all strand-block mastic is manufactured by Chase Corporation. This material is stable, works well in the electrical field and is employed during the manufacture of cables. It easily passes industry standard tests (like ICEA T31-610) and has been used successfully for more than 25 years. The general industry belief is that if one blocks the migration of water in the conductor then the cable life will be extended as water trees cannot be formed without water.

Chase A162A strand block mastic was introduced to the MV Power Cable Industry in 1990 and has been effectively used since (see Table 1). This material is sold under the name A162A BIH2Ock. Pre-1990 materials used by manufacturers (Excl. Pirelli Cables) were materials formulated in-house by material chemists. Chemists in the solar industry use similar formulas to seal solar panels to boards and electronics. Pirelli used an in-house developed polyisobutylene (PIB) based material supplied by United Technologies of St Louis, MO However, industry experts have confirmed that all mastic formulations are very similar and have very similar physical properties.

TABLE 1

Formulation & Proportions: Polyisobutylene (PIB) - based; Exxon Chemicals Americas.

| Ingredient | Weight % | Specific Gravity | Specific Volume | Tolerance (+/−), % |
|---|---|---|---|---|
| Vistanex LM-MS | 59.41 | 0.914 | 109.409 | 1.00 |
| Irganox 1010 | 0.99 | 1.15 | 1.449 | 10.00 |
| Graphite | 39.60 | 2.26 | 29.499 | 1.00 |
| Total | 100.00 | 1.199 | 140.357 | |

Conventional Injection Methods are Not Suitable:

The industry has created and accepted ANSI/ICEA T31-610 "Test Method for Conducting Longitudinal Water Penetration Resistance Tests on Blocked Conductors" and IEEE 1142-2009 "IEEE Guide for Selecting, Testing, Application, and Installation of Cables Having Radial Moisture Barriers and/or Longitudinal Water Blocking" as tests to ensure cables have an adequately blocked conductor.

Due to the shortage of free interstitial volume in strand-blocked cable, lack of continuous flow path and physical properties of the strand block material, conventional injection methods as described in U.S. Pat. No. 7,615,247, "Method for treating electrical cable at sustained elevated pressure", U.S. Pat. No. 8,205,326, "Method for treating electrical cable at sustained elevated pressure", U.S. Pat. No. 8,656,586, "Method for treating electrical cable at sustained elevated pressure", and U.S. Pat. No. 8,572,842, "Method for thermally enhancing injection of power cable", are not suitable as currently practiced for strand blocked cable.

A new method to inject power cables manufactured with PIB based strand block mastics is necessary. It is desirable to inject the cable's conductor with enough fluid volume to protect the cable's insulation from water trees for a duration similar to the treatment of non-strand blocked cable.

BRIEF DESCRIPTION OF THE SEVERAL VIEWS OF THE DRAWINGS

FIG. 3B-1 illustrates the volumetric change of the strand-block mastic through pressurization and depressurization with using compressed Carbon Dioxide gas.

FIG. 3B-2 illustrates the volumetric change of the strand-block mastic through pressurization and depressurization with using compressed Helium gas.

FIG. 3B-3 illustrates the volumetric change of the strand-block mastic through pressurization and depressurization with using compressed Nitrogen gas.

DETAILED DESCRIPTION OF THE INVENTION

Figure 1:
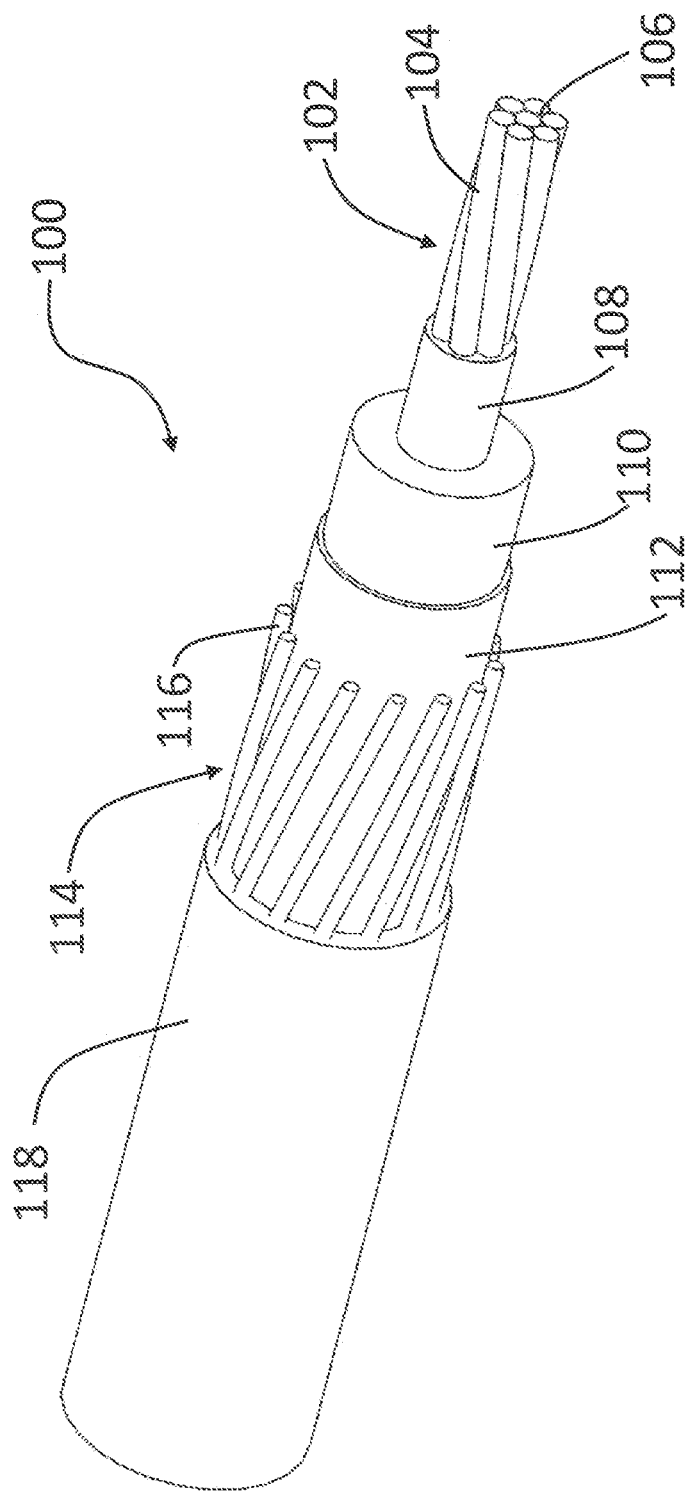
FIG. 1 illustrates a typical prior art medium voltage (MV) cable construction.

A new injection protocol for rejuvenating a strand-blocked cable having a conductor comprised of a plurality of conductor strands with interstitial volume therebetween blocked by a PIB based strand-block mastic, the conductor being surrounded by a polymeric cable insulation, comprising:

A. the pre-injection of compressed gas into the conductor strands of the cable at a pressure less than the elastic limit of the cable insulation and shield materials to create a flow path, and B. the injection of a rejuvenation fluid into the conductor strands of the cable at a pressure less than the elastic limit of the cable insulation and shield materials.

Material Properties of PIB:

While the composition of PIB-based longitudinal strand block mastic has been previously disclosed in literature, little is known about the physical properties of PIB-based strand block material. An understanding of the construction and physical properties of the strand block mastic will allow the injection technician to better select the injection fluid and parameters of pressure and temperature used for injection. These properties include the conductor fill %, carbon black content of the mastic and the viscosity and glass transition temperature for various strand block mastic materials.

Conductor Fill %:

In a strand-filled cable, the amount of strand block material contained in the conductor can be quantified as the Fill %. The free volume is the volume between the conductor strands not occupied by the strand fill mastic. The free volume can be calculated as outlined below.

For various strand block cable makes and vintages, a detailed cable geometry was performed on each cable to calculate interstitial volume. The amount of strand block material per unit length was determined by weighing before and after removal of the strand block with toluene. The difference in mass being the amount of the strand block material per unit length. In this study, a unit length of 12 inches of cable was used. The density of strand block materials based on PIB can be found in literature and was confirmed through testing to generally range between 1.17 and 1.20 g/cm$^3$.

For the purpose of this calculation, a density of 1.20 g/cm$^3$ was assumed and used to calculate the filled volume. The results of the analyses are shown in Table 2.

TABLE 2

Fill % for Various Strand Blocked Cable Samples

| Cable Manufacturer | Cable Vintage | Conductor Size (AWG) | Interstitial Volume (cc/ft.) | Strand Block PIB (g/ft.) | Fill % |
|---|---|---|---|---|---|
| BICC-Brand MT | 2003 | #2 | 1.0 | 0.418 | 34% |
| BICC-Brand MT | 2008 | 1/0 | 3.2 | 2.283 | 59% |
| Cable MT | Early 2000s | 1/0 | 3.2 | 2.226 | 58% |
| Hendrix | 2019 | 1/0 | 3.2 | 1.557 | 41% |
| Nexans | 2019 | 1/0 | 3.2 | 2.451 | 64% |
| Oconite | 2018 | 1/0 | 3.2 | 0.770 | 24% |
| Pirelli | 1996 | 1/0 | 3.2 | 1.477 | 38% |
| Pirelli | 1996 | 1/0 | 3.2 | 1.671 | 43% |
| Pirelli | 2005 | 1/0 | 3.2 | 2.313 | 60% |
| Prysmian | 2019 | 1/0 | 3.2 | 1.682 | 44% |
| Prysmian | 2019 | 1/0 | 3.2 | 2.250 | 59% |
| Prysmian | 2019 | 1/0 | 3.2 | 1.769 | 46% |
| Prysmian | 2020 | 1/0 | 3.2 | 1.802 | 47% |
| Prysmian | 2020 | 1/0 | 3.2 | 1.780 | 46% |
| SOUTHWIRE | 2014 | 4/0 | 6.8 | 1.279 | 16% |
| SOUTHWIRE | 2004 | 1/0 | 3.2 | 1.801 | 47% |
| SOUTHWIRE | 2017 | 1/0 | 3.2 | 0.731 | 19% |
| | | | | Average | 44% |

Fill percentage is found to range from under 20% to over 60%. As not all cable makes and vintages were quantified, the actual range could be appreciably more. Variation is noted between manufacturers, vintages, spools from the same apparent manufacturing run, and along the length of the same cable.

The measurements reveal that on average, about 44% of the conductor's interstitial volume is filled by strand block material. If fluid were to be injected and fill the remaining 56% void space that would leave most medium voltage cables undertreated. As an example, an average non-strand filled I/O AWG cable with light compression has an interstitial volume of 3.2 cc/ft. For a non-strand filled cable, the fluid target would be a complete fill of the interstitial volume. However, in a strand block cable, a maximum free volume to receive treatment would typically be at best 56% of 3.2 cc/ft or 1.8 cc/ft and leave the cable under the fluid target. However, as strand block mastic is not uniformly distributed within the conductor and the free volume is actually a distribution of small voids, a complete fill of the free volume is unlikely.

Carbon Black Content:

In addition to molecular weight of the PIB, carbon black is known to have influence on the physical properties of mastics. A weighed portion of mastic (16.3579 g) was added to about 3 times as much weight of toluene, and the mixture was dissolved by shaking and heating in a 55° C. oven. The black suspension in yellow liquid was filtered through a weighed medium fritted filter funnel to trap the carbon black. The carbon black was washed on the filter frit with additional toluene to remove any remaining PIB. The carbon black was then washed with acetone and dried by pulling air through the frit for 1 hour. The frit was then placed in a 55° C. oven to remove any remaining solvent, and then the frit plus carbon black was weighed. The weight of the carbon black recovered was 7.9444 g or 48.6 wt % of the initial weight of mastic. This value is significantly higher than the 39.6 wt % documented by industry. This variation likely explains some of the differences observed between strand block materials of various cable manufacturers and vintages.

Glass Transition Temperature ($T_g$):

Differential Scanning calorimetry (DSC) was performed on strand block (SB) mastic samples collected from five cable manufacturers including Southwire 2017, Pirelli 1987, Hendrix 2012, Prysmian 2009 and Okonite 2018. All cables were XLPE insulated with the exception of the Okonite sample which was EPR insulated.

Samples were tested using a Mettler Toledo model DSC 3+. The parameters for testing began at −90° C. That temperature was held for 2 minutes to ensure the sample had thermally equalized. At a rate of 10° C. per minute, the chamber was heated to 90° C., held for 1 minute then cooled at the same rate back to −90° C. This temperature cycle was performed twice for each sample. The first temperature cycle of a polymer sample often contains the thermal history of the material which is then erased in subsequent cycles.

The four mastic samples show similar features especially in the second cycle when thermal history has been erased. All mastic samples show a characteristic endothermic peak near −70° C. This peak corresponds to the glass-transition temperature (Tg) for polyisobutylene rubber (PIB). The onset temperature and peak temperature were recorded and can be seen in Table 3.

TABLE 3

Glass Transition Temperature for various strand block mastics

| | Glass-Transition Temperature (Tg) - °C. | | | |
|---|---|---|---|---|
| Sample | Tg Onset - First Cycle | Tg Onset - Second Cycle | Tg Peak - First Cycle | Tg Peak - Second Cycle |
| Pirelli-1987 | −69.16 | −68.97 | −66.81 | −66.34 |
| Southwire-2017 | −72.26 | −73.05 | −70.85 | −71.56 |
| Hendrix-2012 | −72.75 | −73.28 | −71.21 | −71.47 |
| Prysmian-2009 | −70.01 | −70.23 | −68.49 | −68.35 |

Viscosity:

An Anton Paar MCR302 rheometer was used to measure flow characteristics of various strand block samples collected from new and field-aged cables. The rheometer used the parallel plate method at a constant torque of 0.01 Nm and measured the resistance to flow, or viscosity, of the mastic. Measurements were taken in 5° C. increments from 100° C. down to 40° C.

Figure 2:
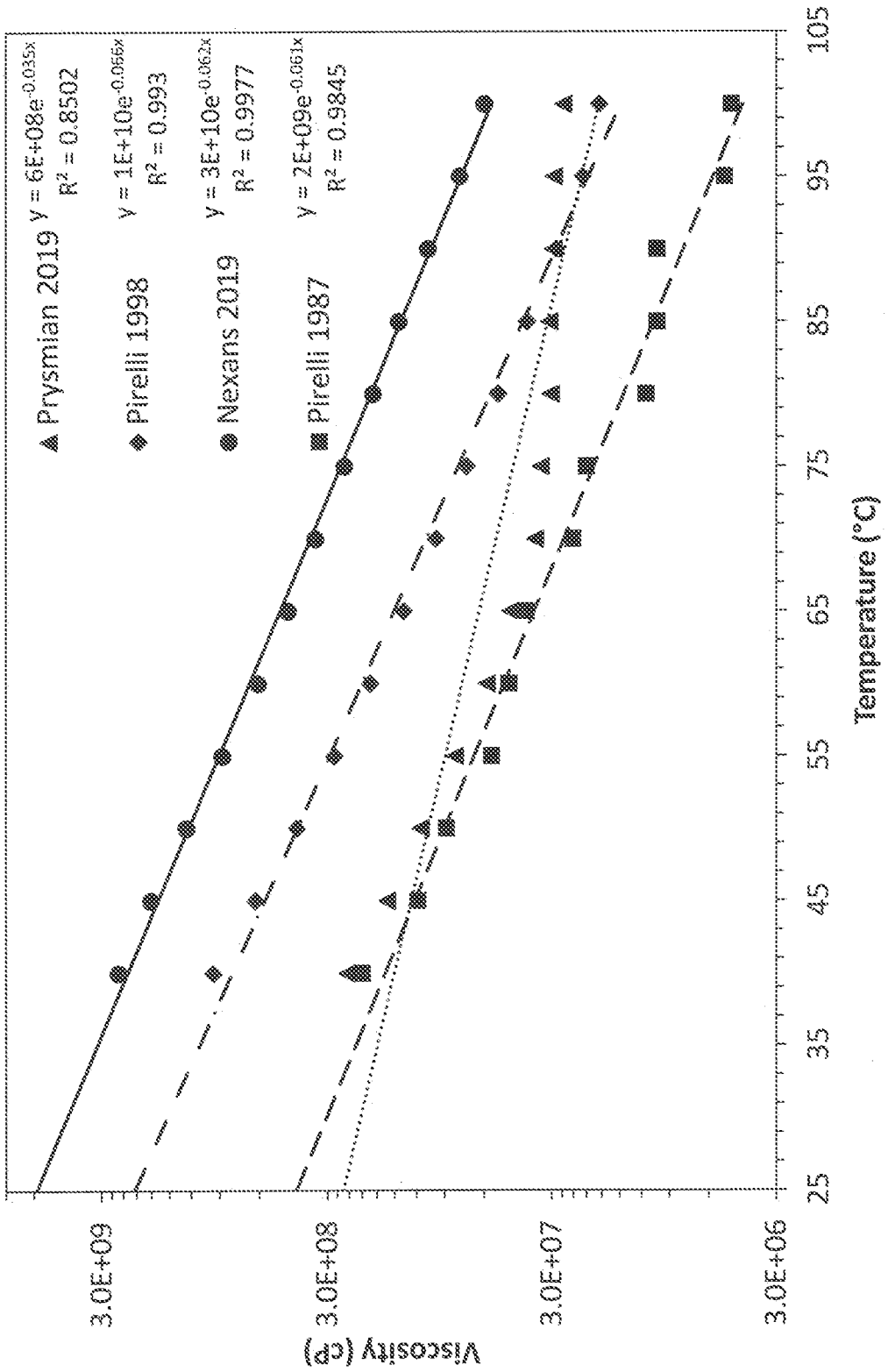
FIG. 2 illustrates viscosity curves for various strand block mastics.

The data is shown in FIG. 2 with the rheometer platen temperature on the X-axis and the log of viscosity on the Y-axis. Exponential fitted lines with R-squared values and equations are shown for each sample. Fitted lines were extrapolated to 25° C. to show the viscosity near room temperature. From 40° C. to 70° C. all samples follow the same exponential decrease in viscosity as the temperature increases. The same is also true up to 100° C. for all samples except the Prysmian 2019, which showed some instability at higher temperatures.

During the collection process it was noted that strand-block materials varied in adhesion, notably the Nexans 2019 mastic was the stickiest. The data reveals that for a given temperature, the viscosity difference between samples can vary by more than one order of magnitude. This variation is attributed to the difference in molecular weight of the PIB and specific concentration of carbon black. The data also reveals that mastics tend to experience about an order of magnitude change in viscosity for every 40° C. change in temperature.

Density:

The density of PIB-based strand block mastic was determined using density standards comprised of varying amounts of calcium chloride and water. Strand block mastic was harvested from a 2019 vintage I/O AWG 15 kV 100% TRXLPE insulated cable. Three samples were tested and the results are shown in Table 4. On average, the density of the PIB-based mastic was found to be 1.097 g/cm$^3$ and significantly lower than the 1.17 to 1.20 g/cm$^3$ values found in literature.

TABLE 4

Density of PIB-based Strand Block Mastic

| Sample | Density (g/cm$^3$) |
|---|---|
| 1 | 1.088 |
| 2 | 1.107 |
| 3 | 1.097 |
| Average | 1.097 |

The understanding of the PIB-based strand block mastic's physical properties can be applied to create an injection protocol tailored to strand block cables.

In one embodiment, the cable temperature is increased by about 40° C. above ambient.

Further, the cable temperature is increased so that the viscosity of the strand-block mastic is decreased by about 1 order of magnitude or greater.

Material Properties of PIB-Based Strand-Block Mastic can be Altered:

While the testing above demonstrates a temperature dependence to physical properties like viscosity, physical properties may be further altered through the injection of compressed gasses. Specifically, density, firmness and viscosity can all be altered through the injection of pressurized gas and a rapid depressurization for the purpose of aiding injection.

Density:

Samples of PIB-based strand-block mastic were collected as above from an 2019 vintage I/O AWG 15 kV cable with 100% rated TRLXPE insulation. Spherical samples weighing about 1.0 g (approximately 1.07" diameter) were pressurized to 300 psi in a pressure vessel for over 12 hours, then depressurized quickly to ambient for analysis of their physical properties. The test looked to highlight differences between various test gasses which included carbon dioxide, helium and nitrogen.

Figure 3A:
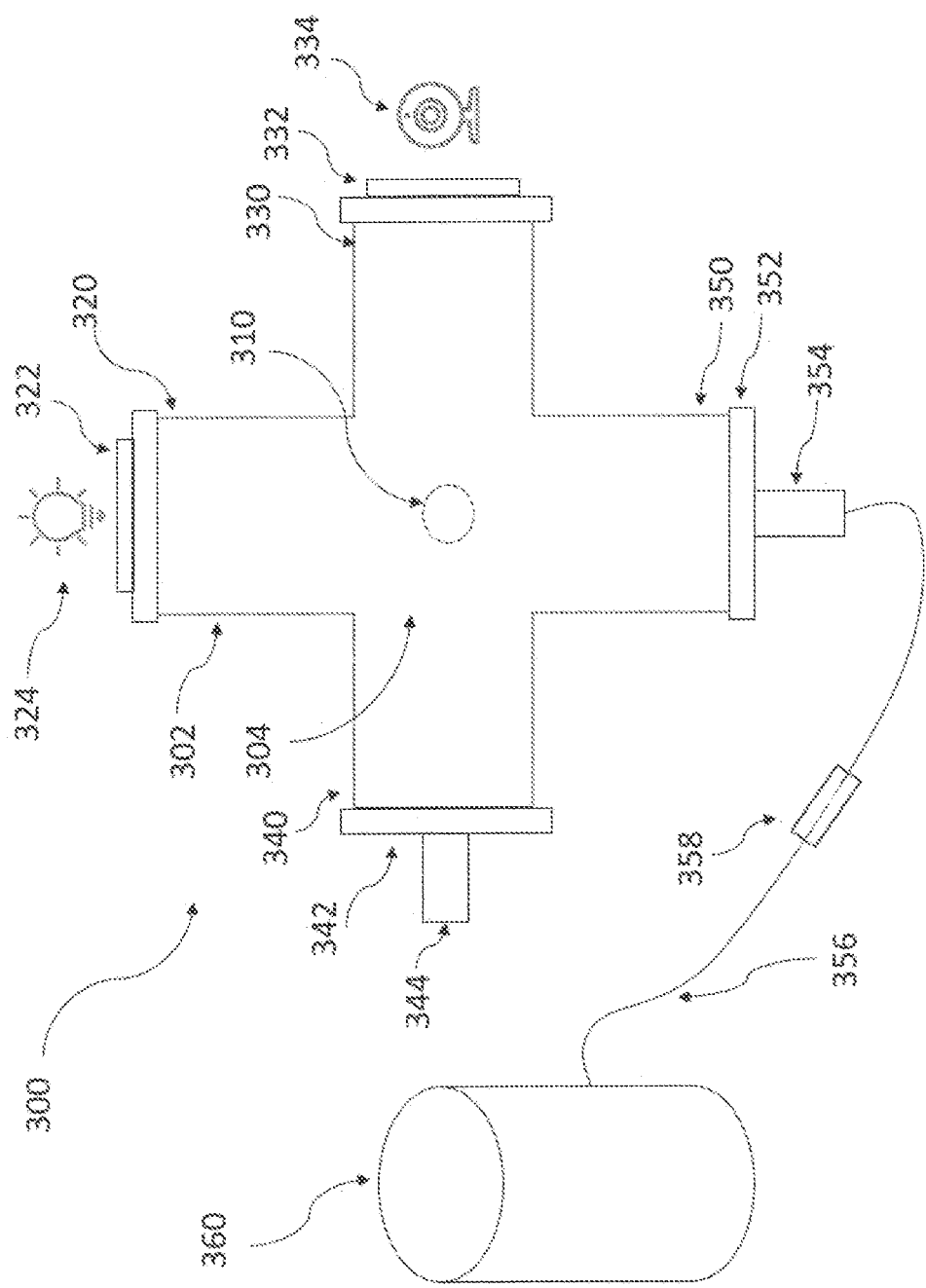
FIG. 3A is a pressure vessel test setup and apparatus.

In FIG. 3A, pressure vessel test setup 300 consists of 1.5" Pipe cross 302. The pipe cross consists of inner cavity 304 where PIB-based strand block mastic sample 310 is positioned at the center. The pipe cross consists of 4 ports, 320, 330, 340 and 350, each with a 1.5 FNPT pipe thread. Port 320 is sealed with a lens 322. Through lens 322, light source 324 is positioned to illuminate the mastic sample 310 placed inside the inner cavity 304. Port 330 is sealed with a lens 332. Through lens 332, camera 334 is positioned to document changes to mastic sample 310 placed inside the inner cavity 304. Port 340 is sealed with a plug 342. Plug 342 contains a pressure relief valve 344 configured to relieve pressure from inside pipe cross 302 should over pressurization occur. Port 350 is sealed with a plug 352. Plug 352 contains fitting 354 that connects to a regulated high-pressure gas cylinder 360 through high pressure tubing 356 and valve 358.

As the PIB-based mastic samples are depressurized, their volume increases and density decreases. The most significant increase occurs in the few seconds following depressurization, and the degree of expansion varies based on the gas used to pressurize the sample. Carbon dioxide cause the largest degree of expansion, while nitrogen causes the smallest degree of expansion of the three gasses used for testing.

FIG. 3B shows an overlayed image of each of the 3 strand block mastic samples before and after depressurization. In the overlayed images, a dotted line is used to outline the sample after pressurization and a solid line is used to outline the sample after depressurization. The increase in volume for the carbon dioxide and helium samples is easily visible. However, the nitrogen sample appears to have no visible change using this method.

The optical method described above was used to estimate the volume increase in the PIB-based mastic samples a few seconds after depressurization. The data is presented in Table 5. It can be seen that the three gasses tested cause a variation of by about an order of magnitude between each and the other gasses with carbon dioxide having the larges influence of the 3 gasses tested at 347%.

TABLE 5

Percent Volume Increase

| Compressed Gas | % Vol. Increase |
|---|---|
| Carbon Dioxide | 347% |
| Helium | 35% |
| Nitrogen | 0% |

The density of each PIB-based strand block mastic sample was determined before pressurization and after depressurization. The results are shown in Table 6. Density was measured in all cases by creating a solution with calcium chloride and water (if density was greater than that of water) or isopropyl alcohol and water (if density was less than that of water, but more than that of isopropyl alcohol) at known concentration in which the sample was neutrally buoyant.

Table 7 shows the change in density as a percent of the samples density prior to pressurization to 300 psi. The samples exposed to carbon dioxide and helium reach their maximum reduction in density sometime around 30 minutes (78% and 79%, respectively) before climbing back up at the 5 hour mark. Nitrogen however, continues to drop in density between the 30 minute and 5 hour marks. The increase in density between 30 minutes and 5 hours could signal a return to pre-pressurization levels and a worklife window.

TABLE 6

Density of PIB-based Mastic Samples Before Pressurization and After Depressurization

| Compressed Gas | Density (g/cc) | | |
|---|---|---|---|
| | Before Pressurization | 30 Minutes after Depressurization | 5 Hours after Depressurization |
| Carbon Dioxide | 1.088 | 0.8489 | 0.944 |
| Helium | 1.107 | 0.875 | 0.946 |
| Nitrogen | 1.097 | 1.033 | 0.974 |

TABLE 7

Density Change (%) of PIB-based Mastic Samples Before Pressurizing and After Depressurization

| Compressed Gas | Density (% change) | | |
|---|---|---|---|
| | Before Pressurization | 30 Minutes after Depressurization | 5 Hours after Depressurization |
| Carbon Dioxide | 100% | 78% | 87% |
| Helium | 100% | 79% | 85% |
| Nitrogen | 100% | 94% | 89% |

While the effects of compressed carbon dioxide, helium and nitrogen have been demonstrated, it is appreciated that the methodology could be applied to other gasses.

Hardness:

The change in firmness of PIB-based mastic samples was evaluated before and after the pressurization-depressurization protocol. Hardness was measured using a handheld Shore 00 durometer in a manner similar to that outlined by ASTM D2240.

Figure 4A:
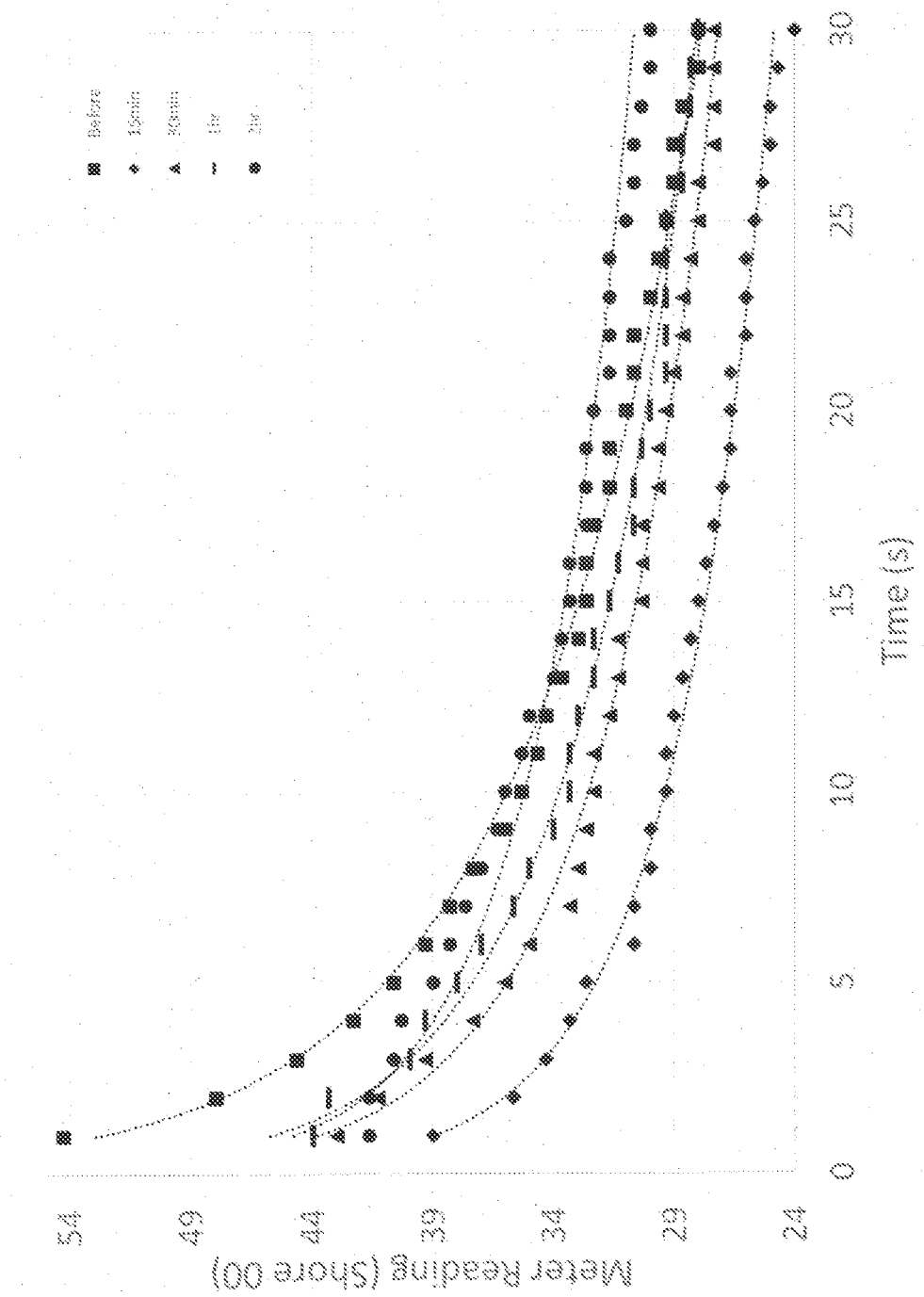
FIG. 4A provides test data showing hardness over time following pressurization-depressurization pre-treatment protocol with Carbon Dioxide.
Figure 4B:
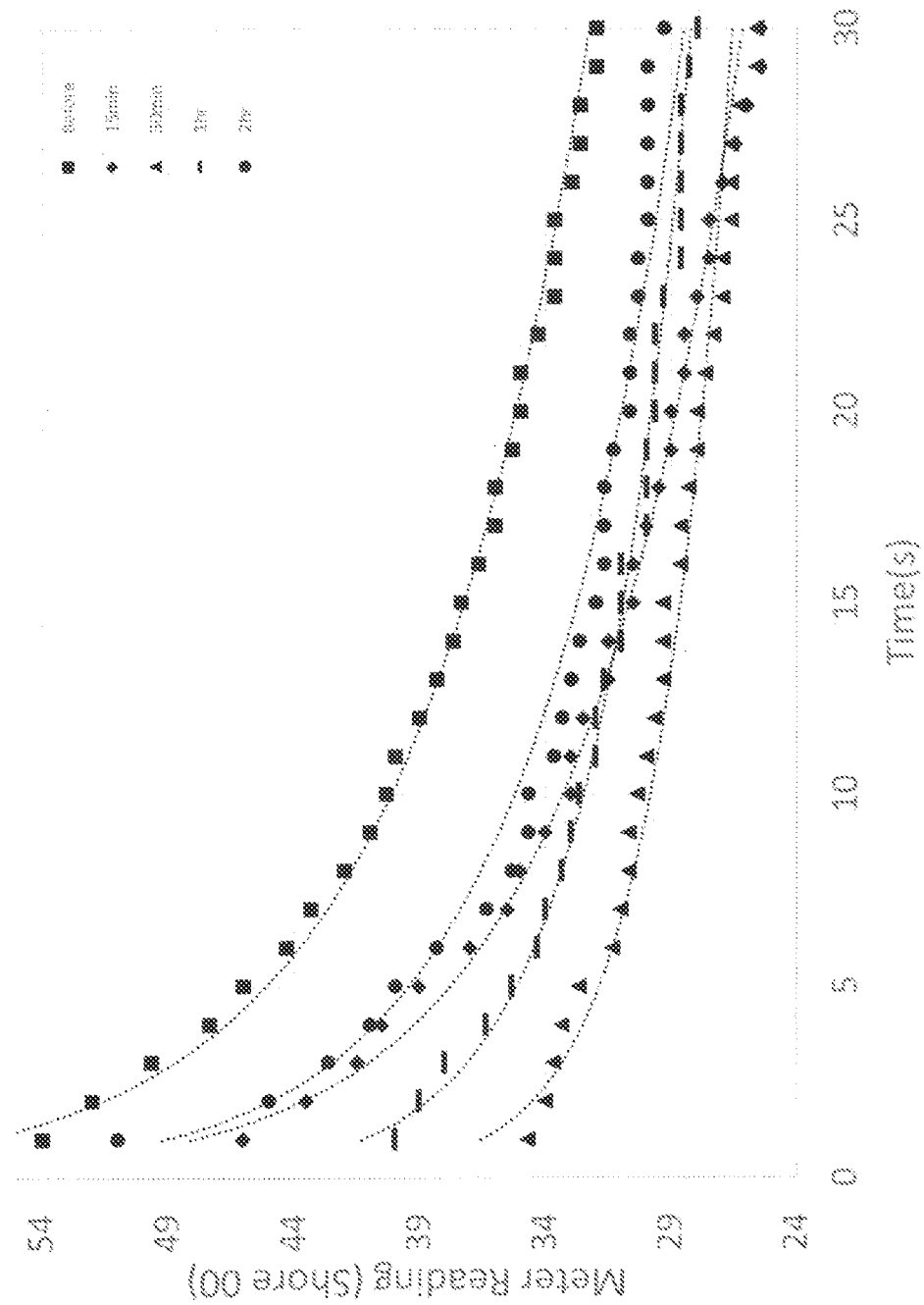
FIG. 4B provides test data showing hardness over time following pressurization-depressurization pre-treatment protocol with Nitrogen.

For the experiment, 2 gram spherical samples of PIB-based mastic were prepared and allowed to equalize to room temperature. The hardness of the samples was measured prior to the pressurization-depressurization protocol to establish a baseline. The samples were placed separately into a pressure chamber like that described in FIG. 3A and held at 300 psi with the test gas for 21 hours. Carbon dioxide and nitrogen were selected for study. Samples were depressurized and removed from the pressure chamber for measurement. Hardness was measured at 15 minutes, 30 minutes, 1 hour and 2 hours after depressurization. Data was collected at each test point for about 30 seconds to fully record both the time varying and constant components for the viscoelastic material. Lab temperature was recorded at each point which ranged between 66 and 72 degrees Fahrenheit for the tests. The 30 second data set for each of the 5 time intervals for the carbon dioxide sample and nitrogen sample are shown in FIG. 4A and FIG. 4B, respectively.

There are two ways to exclude the viscous component of the measurements and get closest to the intended hardness measurement which does not vary in time. First, is the logarithmic trendline intercept. If logarithmic shape can be assumed, the intercept will use all measurements to determine the hardness value at the first measurement, which should include only components which do not vary in time. This method should be less noisy since all 90 samples (3 curves at 30 samples per curve) contribute to the intercept calculation. Second, is the first measured value. If no predictable shape to the curve can be assumed, the maximum (first) measured value should exclude almost all time-varying components. However, since only one sample per curve is taken, the results are more prone to noise.

Table 8 shows the Shore 00 results with each method of analysis. The percent for each hardness measurement relative to the value prior to the pressurization-depressurization pre-treatment protocol is also calculated. The data shows a maximum reduction of 72% for carbon dioxide at approximately 15 minutes after depressurization and 64% for nitrogen at approximately 30 minutes. It is likely that the actual minimum for carbon dioxide occurred between the moment of depressurization and the first measurement at 15 minutes.

TABLE 8

Hardness over time following pressurization-depressurization protocol

| | | Hardness | | | | | | | | |
|---|---|---|---|---|---|---|---|---|---|---|
| | | Before | | After Pressurization/Depressurization | | | | | | |
| | | Pressurization | | 15 min | | 30 min | | 1 hr | | 2 hr |
| Compressed Gas | Method | Shore 00 | % | Shore 00 | % | Shore 00 | % | Shore 00 | % | Shore 00 | % |
| Carbon Dioxide | Logarithmic | 52.9 | 100% | 38.9 | 74% | 43.8 | 83% | 45.7 | 86% | 44.8 | 85% |
| | First Value | 54.3 | 100% | 39.0 | 72% | 43.0 | 79% | 44.0 | 81% | 41.7 | 77% |
| Nitrogen | Logarithmic | 56.6 | 100% | 48.1 | 85% | 36.5 | 64% | 41.3 | 73% | 49.2 | 87% |
| | First Value | 54.0 | 100% | 46.0 | 85% | 34.7 | 64% | 40.0 | 74% | 51.0 | 94% |

Figure 5A:
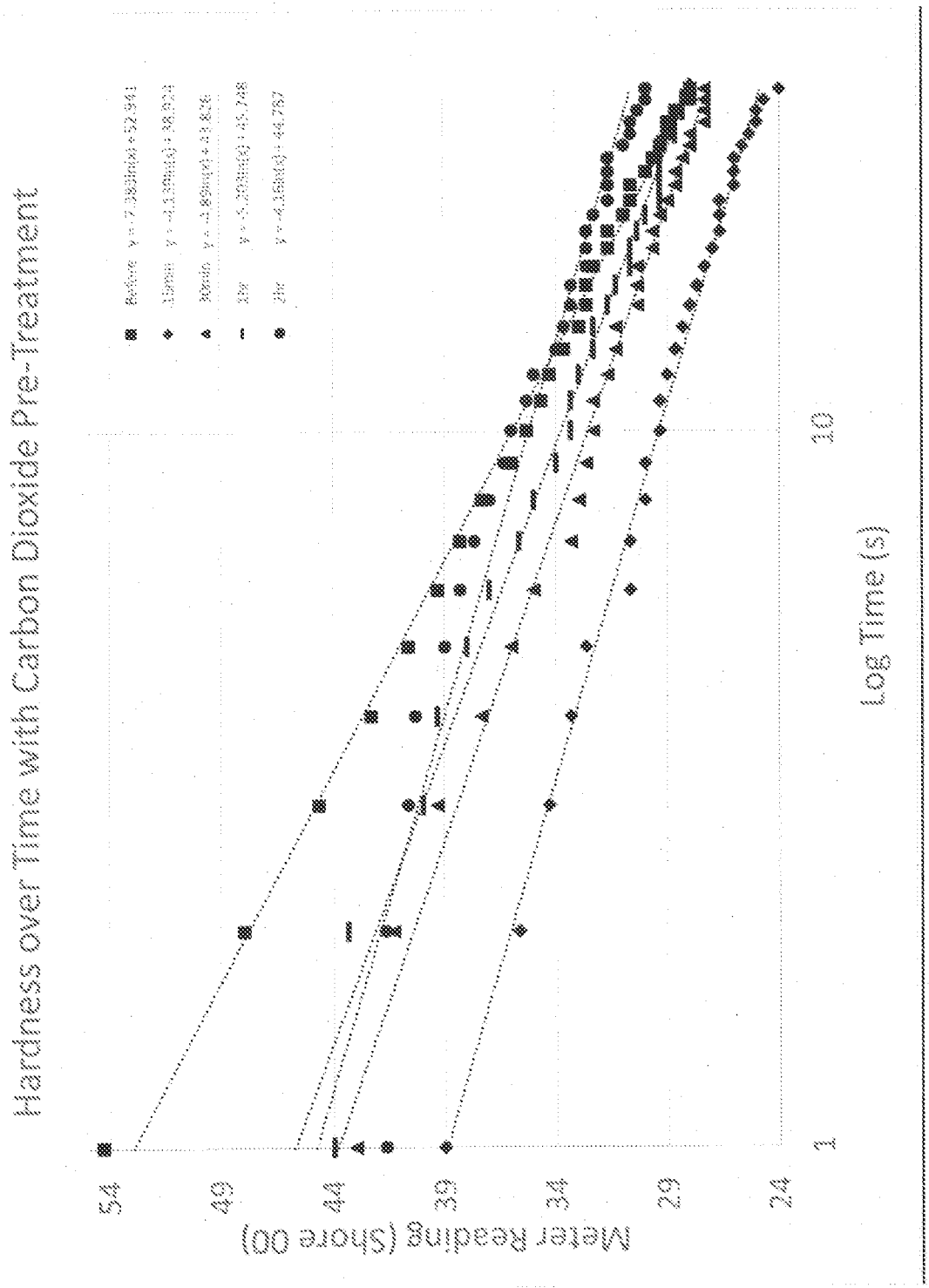
FIG. 5A provides test data showing semi-log plot of hardness over log-time following pressurization-depressurization pre-treatment protocol with Carbon Dioxide.
Figure 5B:
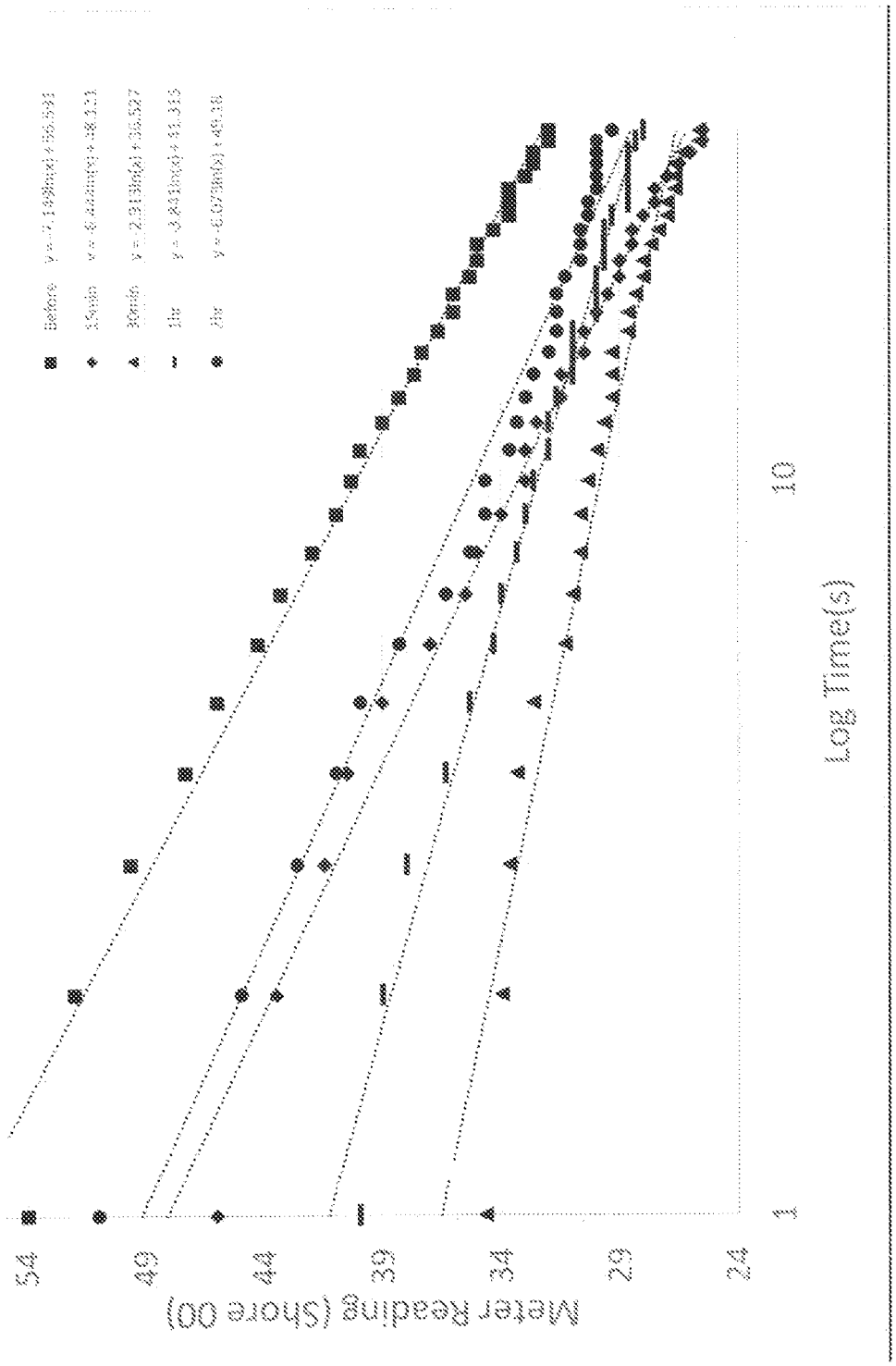
FIG. 5B provides test data showing semi-log plot of hardness over log-time following pressurization-depressurization pre-treatment protocol with Nitrogen.

Viscosity:

The time dependent hardness measurements shown in FIGS. 4A and 4B were reproduced using a semi-log scale FIGS. 5A and 5B. The magnitude of the slope for each curve is reported in Table 9 and may be considered to be representative of the viscosity for visco-elastic materials. The percent for each slope relative to the value prior to the pressurization-depressurization pre-treatment protocol is also calculated. The data shows a maximum reduction of 56% for carbon dioxide at approximately 15 minutes after depressurization and 41% for nitrogen at approximately 30 minutes.

TABLE 9

Representative viscosity using slope magnitude of hardness over time following pressurization-depressurization protocol

| Compressed Gas | Before Pressurization | | After Pressurization/Depressurization | | | | | | | |
|---|---|---|---|---|---|---|---|---|---|---|
| | | | 15 min | | 30 min | | 1 hr | | 2 hr | |
| | Slope | % | Slope | % | Slope | % | Slope | % | Slope | % |
| Carbon Dioxide | 7.38 | 100% | 4.14 | 56% | 4.89 | 66% | 5.20 | 70% | 4.16 | 56% |
| Nitrogen | 7.15 | 100% | 6.44 | 90% | 2.91 | 41% | 3.84 | 54% | 6.07 | 85% |

While the effects of carbon dioxide and nitrogen have been used to demonstrate changes in hardness and viscosity, it is appreciated that the same methodology could be applied to other gasses.

Figure 6:
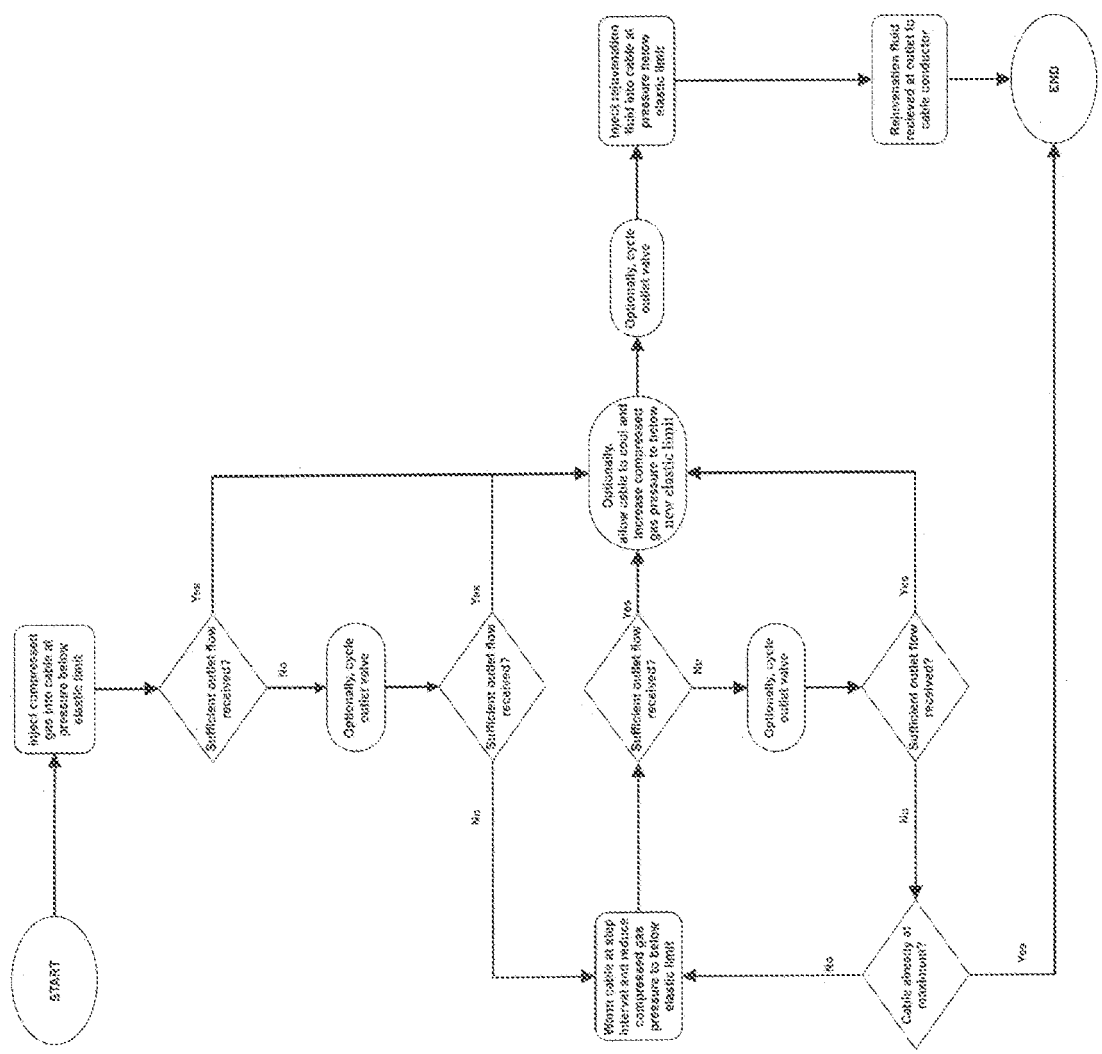
FIG. 6 is a process flow chart for injecting strand-blocked cable.

Flow Path can be Enhanced in a Cable:

While prior art has described the use of compressed gas flow to dry the cable (Katz et al., Laboratory Investigations Leading to Extending Service Life of Installed Extruded Dielectric Cable ICC Spring 1986) or to passively detect the presence of an open flow path in a cable prior to injection with liquid (CEATI Report #T154700-50/129—Cable Rejuvenation Practices), the current invention for injecting strand-blocked cables uses compressed gas flow to open a continuous flow path and expand the flow path by altering the physical properties and/or structure of the PIB-based strand-block mastic through which a rejuvenation fluid can be injected to treat the cable. Referring to FIG. 6, the process involves injecting a compressed gas into the interstitial region of a power cable constructed with a PIB-based strand block mastic. The injection pressure is selected as to be below the elastic limit of the cable. The pressure will be determined by the construction of the cable and the ambient temperature. In one embodiment, the pressure may be 100 psi. In yet another embodiment, the pressure may be over 350 psi. If sufficient outlet flowrate is received, for example above 1 standard liter per minute (SLPM), the cable may be injected with a rejuvenation fluid at a pressure below the elastic limit of the cable. If the outlet flowrate is insufficient, the outlet valve may optionally be cycled. This step will allow the length of cable to be pressurized and then depressurized. The hold time for each cycle may be momentary or lasting minutes or hours in duration. In one embodiment, the hold time may be 1 minute. In another embodiment, the hold time may be 10 minutes or longer. If sufficient outlet flowrate is received, the cable may be injected with a rejuvenation fluid at a pressure below the elastic limit of the cable. If the outlet flowrate is insufficient, the cable may be warmed through step intervals using resistive heating or other means until a sufficient flow rate is achieved or a maximum temperature for the cable is reached. Each step interval may be for example 10° C. of conductor temperature rise but could be more or less. With each step, the injection pressure is reduced as to be maintained below the elastic limit of the cable as it warms. The outlet valve may be cycled to pressurize and depressurize the sample. If at any step, sufficient outlet flowrate is achieved, the cable may be optionally cooled, for example to ambient temperature. Optionally, the pressure of the compressed gas may be adjusted to match the new conductor temperature of the cable and the outlet valve may be cycled. With sufficient flow rate achieved, the strand-blocked cable will be injected with a rejuvenation fluid at a pressure below the elastic limit of the cable. However, if the outlet flowrate remains insufficient up to the maximum temperature, for example the maximum operating temperature rated for the cable, then the process may be terminated as another source of blockage is likely.

EXAMPLE

The following experiment was performed to demonstrate the advantages of the pre-injection protocol outlined above.

For the purpose of the test, a 2020 vintage 15 kV rated Prysmian Doubleseal cable was selected. The cable had a I/O AWG aluminum conductor with 100% rated tree-retardant cross-link polyethylene (TR-XLPE) insulation measuring 175 mils in thickness.

Figure 7:
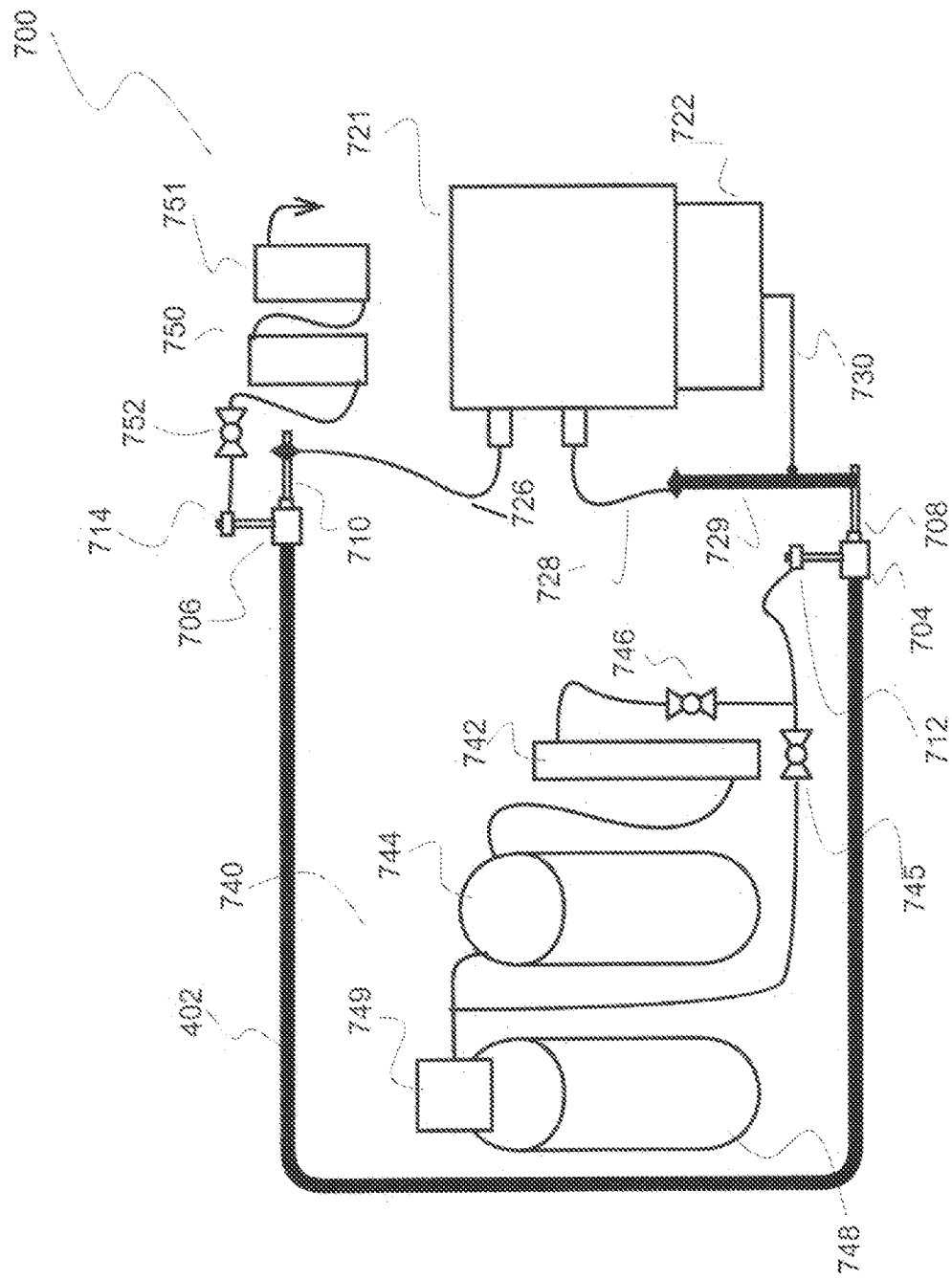
FIG. 7 is an experimental setup for injection of strand-blocked cable.

Referring to FIG. 7, test setup 4700 is comprised of a cable sample 402 arranged in a U shape. The cable sample is terminated at both ends with electrical connectors 4708 and 4710 and injection adapters 4704 and 4706, respectively, to make the fluid seal. A controlled current supply 4721 is connected to each end of the cable sample through interconnect cables 4726 and 4728 to complete the circuit. The controlled current supply is connected to a temperature controller 4722 through interconnect 4730 to provide on/off control of the current. The temperature controller is joined to a dummy cable sample 4729 through test lead 4730 to monitor temperature. Injection tools 4712 and 4714 are used to provide fluid access to the injection adapters on the feed side and receiving side of the cable sample, respectively. The feed side of the cable is connected to a feed assembly 440 through a ball valve 4746 for fluid, and ball valve 4745 for gas, allowing each to be selected by the operator. The feed assembly is comprised of a fluid flow meter 4742, a fluid injection tank 4744 and a compressed gas cylinder 4748 with regulator 4749. The receiving side of the cable is connected to a catch tank 4750 through a ball valve 4752, isolation tank 4750, and gas flow meter 4751.

Six cable samples were prepared and tested separately in the test setup. Cable samples 1, 2, 3, 5 and 6 were injected using the test protocol with pre-injection outlined below. Sample 7 was injected following the test protocol without pre-injection as a control. All samples measured 50 feet long and were injected with a silicone-based rejuvenation fluid mixture comprised mainly of a blend of tolylethylmethyldimethoxysilane (TEM), cyanobutylmethyldimethoxysilane (CBM) and a hydrolysis condensation catalyst DDBSA (dodecylbenzene sulfonic acid). While this fluid blend was selected for the purpose of the test, it is appreciated that other silanes and hydrolysis-condensation catalysts could be used. For example, the rejuvenation fluid could consist of phenylmethyldimethoxysilane (PhMDM) and tetra-isoproyl titanate (TiPT) or other combination of dialkoxy-silanes and hydrolysis-condensation catalyst.

Test Protocol with Pre-Injection:
1. Check for sufficient and stable flow by applying 350 psi carbon dioxide to one end of cable, while the receiving end has an attached gas flow meter.
2. Heat cable to 60° C. and apply 200 psi carbon dioxide to one end, while the receiving end has an attached gas flow meter.
3. Once flow is detected at the receiving end of the cable, close the receiving end valve for 5 minutes to pressurize the cable.
4. Open the valve and wait for the receiving end flow to become stable, maintain carbon dioxide gas flow at 200 psi while adjusting the heating system setpoint to 30° C.
5. When 30° C. is reached, increase carbon dioxide pressure to 350 psi.
6. Close receiving end valve for 5 minutes to pressurize cable, then open the valve.
7. Wait for carbon dioxide gas flow to stabilize at 350 psi through the cable.
8. Close the valve to the carbon dioxide gas source and proceed to injection protocol.
9. Pressurize the fluid injection tank to 350 psi.
10. Open the valve from the fluid injection tank and begin the injection of rejuvenation fluid into the cable. Monitor the weight change of the injection tank.
11. When fluid arrives at the receiving end of the cable, close the outlet valve.
12. Continue to pressurize and soak the cable with rejuvenation fluid until treatment level is achieved.

Test Protocol without Pre-Injection:
1. Pressurize the fluid injection tank to 350 psi.
2. Open the valve from the fluid injection tank and begin the injection of rejuvenation fluid into the cable. Monitor the weight change of injection tank.
3. When fluid arrives at the receiving end of the cable, close the outlet valve.
4. Continue to pressurize and soak the cable with rejuvenation fluid until treatment level is achieved.

The results are summarized in Table 10. Testing reveals about 10 times decrease in the duration of injection when cables undergo the pressurization-depressurization pretreatment protocol as compared with a control where pretreated had not been used.

TABLE 10

| Injection results | | | | | | |
|---|---|---|---|---|---|---|
| Cable | 1 | 2 | 3 | 5 | 6 | 7 |
| Pre-treated | Yes | Yes | Yes | Yes | Yes | No |
| Injection time (mm:ss) | 6:40 | 6:40 | 10:50 | 5:27 | 4:15 | 66:30 |
| Treatment Level at Fluid In (g/ft) | 1.30 | 0.97 | 1.11 | 1.06 | 1.15 | 0.91 |
| Max gas flow rate prior to injection (lpm) | 4.0 | 6.0 | 2.5 | 7.0 | 4.5 | n/a |

Figure 8A:
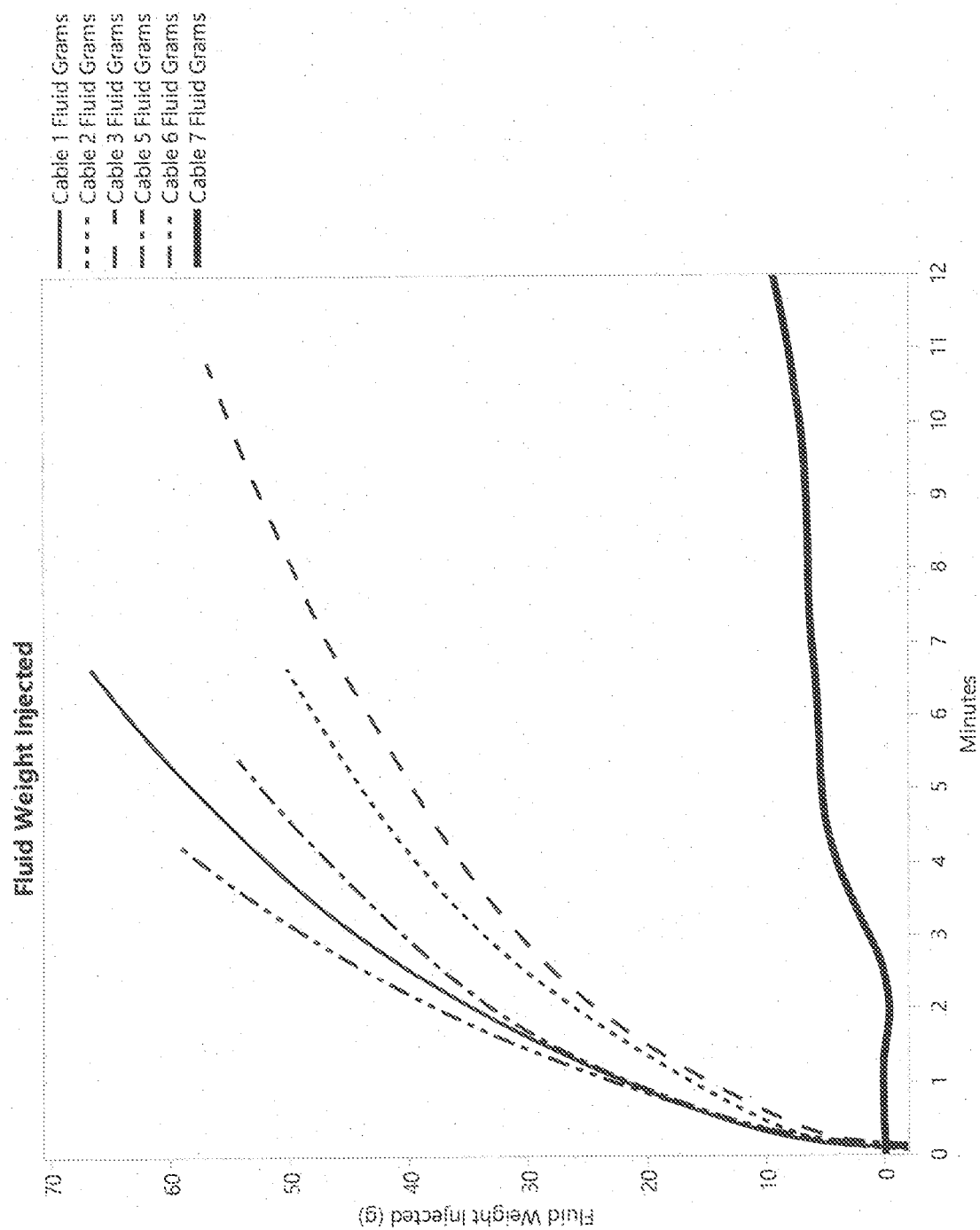
FIG. 8A provides test data showing the fluid injected vs. time.

FIG. 8A shows the effects of the pretreatment process using cables of identical nominal dimensions, length, manufacturer and year of manufacture. The trace of Cable 7 represents the control cable which was not pretreated, while all others were. The x-axis has been trimmed at 12 minutes in this plot for clarity. The Control sample (Cable 7) shows a delayed start to inject and an inject rate that is about 10× lower than the 5 test cables.

Figure 8B:
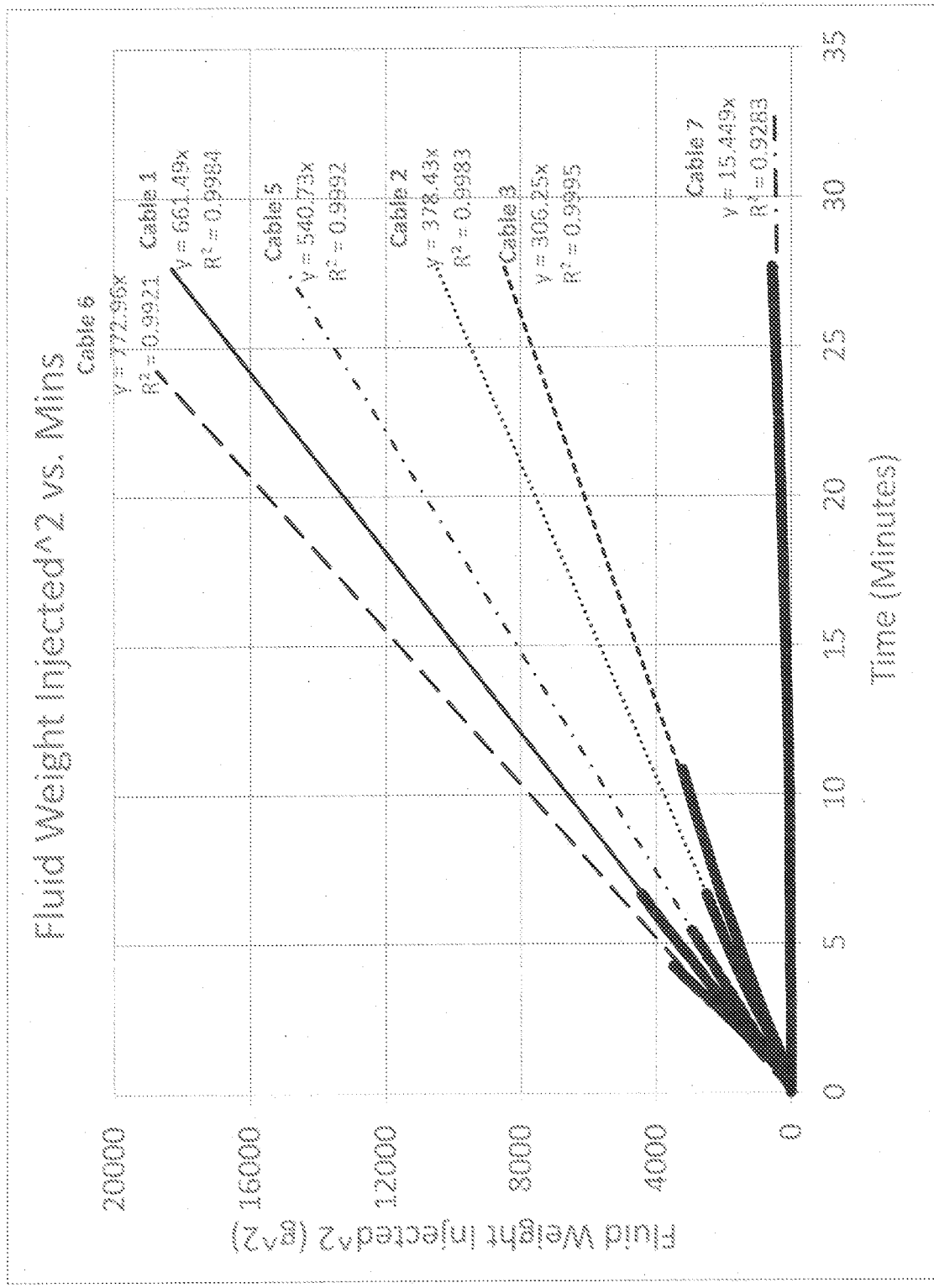
FIG. 8B provides test data showing fluid injected vs. time (Power-2 y-axis).

Referring to FIG. 8B, the same data is plotted but with the grams injected squared to produce a relatively linear trace. The slope for the linear model and fit for the 6 cables is provided and also reproduced in Table 11. The slope may be used as a specific flow constant for each injection and used to extrapolate injections on longer lengths of cable.

TABLE 11

| Flow constant linear approximation | | | | | | |
|---|---|---|---|---|---|---|
| Cable | 1 | 2 | 3 | 5 | 6 | 7 |
| Slope | 661 | 378 | 306 | 541 | 773 | 15 |
| R-square | .9984 | .9983 | .9995 | .9992 | .9921 | .9283 |

Figure 8C:
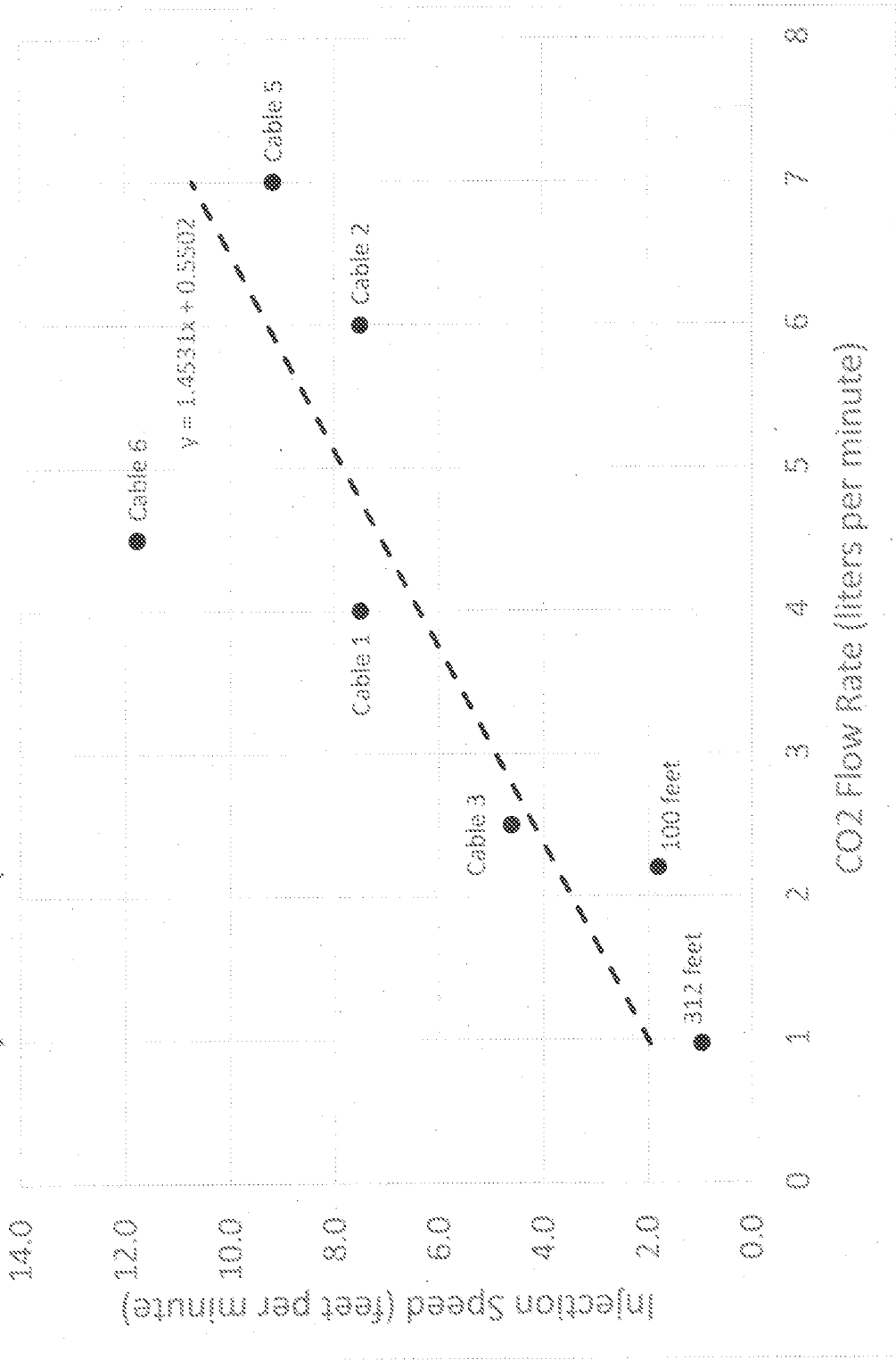
FIG. 8C shows Injection Speed vs. Pretreatment Flow Rate.

FIG. 8C shows a correlation between the flow rate of gas measured at the receiving end of the cable at the end of the pretreatment process in standard liters per minute (SLPM), and the speed of the injection, measured in average fluid front feet per minute. The correlation highlights another important advantage of the pretreatment process in the ability to provide a relative indicator of a fluid flow rate for a particular cable. This effect has been confirmed on test cables measuring 100 feet and 312 feet long and are also included in FIG. 8C. This, along with observations of flowing gas from the receiving end of the cable during the injection process, suggests that the pretreatment process has removed blockages preventing flow as described above. This means that the performance of the injection can be extrapolated to longer cables with greater certainty, as long as those cables are using the same pretreatment process.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A method for rejuvenating a strand-blocked cable, comprising:
   a. positioning a longitudinally strand-blocked cable having a conductor comprised of a plurality of conductor strands with interstitial volume therebetween longitudinally blocked by a polyisobutylene (PIB) based strand-block mastic and surrounded by a polymeric cable insulation to receive injection of a compressed carbon dioxide gas into the interstitial volume of the strand-blocked cable at a first cable location along the strand-blocked cable;
   b. next, injecting the compressed gas into the interstitial volume of the strand-blocked cable at a pressure that opens a continuous flow path along a length of the strand-blocked cable extending between the first cable location and a longitudinally separated second cable location along the strand-blocked cable and expand the continuous flow path by altering the physical properties and/or structure of the PIB based strand-block mastic through which a rejuvenation fluid can be injected to treat the strand-blocked cable, the pressure being less than the elastic limit of the cable insulation;
   c. after the continuous flow path is formed by the injection of the compressed gas, depressurizing at least a portion of the strand-blocked cable; and
   d. after depressurizing the portion of the strand-blocked cable, injecting the rejuvenation fluid into the conductor strands of the strand-blocked cable along the continuous flow path at a pressure less than the elastic limit of the cable insulation.

2. The method of claim 1, where the injection of the compressed gas forms the continuous flow path along the entire length of the strand-blocked cable and the depressurizing depressurizes the entire length of the strand-blocked cable.

3. The method of claim 1, where a receiving end of the strand-blocked cable is closed off to pressurize the entire length of the strand-blocked cable before depressurizing the portion of the cable.

4. The method of claim 3, where the receiving end of the strand-blocked cable is closed off to pressurize the entire length of the strand-blocked cable for at least 1 minute before depressurizing the portion of the strand-blocked cable.

5. The method of claim 3, where the receiving end of the strand-blocked cable is closed off and the entire length of strand-blocked cable is pressurized to at least 200 psi and then the portion of the strand-blocked cable is depressurized.

6. The method of claim 3, where the injection of compressed gas is at a pressure sufficient to expand the PIB based strand-block mastic by at least 20% and preferably more than 200% after pressurization and depressurization.

7. The method of claim 3, where the injection of compressed gas is at a pressure sufficient to reduce the density of the PIB based strand-block mastic of at least 10% after 30 minutes following pressurization and depressurization.

8. The method of claim 3, where the injection of compressed gas is at a pressure sufficient to reduce the hardness of the PIB based strand-block mastic by about 20% after 30 minutes following pressurization and depressurization.

9. The method of claim 3, where the injection of compressed gas is at a pressure sufficient to reduce the viscosity of the PIB based strand-block mastic by slope-magnitude of about 40%.

10. The method of claim 1, where the conductor temperature is about 40° C. over ambient during the injection of compressed gas.

11. The method of claim 1, where the conductor temperature is reduced to below 30° C. during the injection of the rejuvenation fluid.

12. The method of claim 1, where the rejuvenation fluid is comprised primarily from dialkoxysilanes mixed with a hydrolosysis-condensation catalyst.

13. The method of claim 12, where the rejuvenation fluid is comprised primarily of a mixture of tolylethylmethyldimethoxysilane (TEM) and cyanobutylmethyldimethoxysilane (CBM).

14. The method of claim 12, where the hydrolysis-condensation catalyst is selected from a list of dodecylbenzene sulfonic acid (DDBSA) and tetra-isopropyl titanate (TiPT).

15. A method for rejuvenating a strand-blocked cable, comprising:
   a. positioning a longitudinally strand-blocked cable having a conductor comprised of a plurality of conductor strands with interstitial volume therebetween longitudinally blocked by a polyisobutylene (PIB) based strand-block mastic and surrounded by a polymeric cable insulation to receive injection of a compressed carbon dioxide gas into the interstitial volume of the strand-blocked cable;
   b. next, injecting the compressed gas into the interstitial volume of the strand-blocked cable at a pressure that opens a continuous flow path along a length of the strand-blocked cable by altering the physical properties and/or structure of the PIB based strand-block mastic through which a rejuvenation fluid can be injected to treat the strand-blocked cable, the pressure being less than the elastic limit of the cable insulation;
   c. after the continuous flow path is formed by the injection of the compressed gas, depressurizing at least a portion of the strand-blocked cable;
   d. repeating steps b and c at least one additional time to expand the continuous flow path by further altering the physical properties and/or structure of the PIB based strand-block mastic through which a rejuvenation fluid can be injected to treat the strand-blocked cable, the pressure being less than the elastic limit of the cable insulation; and
   e. after repeating steps b and c at least one additional time, injecting the rejuvenation fluid into the conductor strands of the strand-blocked cable along the continuous flow path at a pressure less than the elastic limit of the cable insulation.

16. A method for rejuvenating a strand-blocked cable, comprising:
   a. positioning a longitudinally strand-blocked cable having a conductor comprised of a plurality of conductor strands with interstitial volume therebetween longitudinally blocked by a polyisobutylene (PIB) based strand-block mastic and surrounded by a polymeric cable insulation to receive injection of a compressed carbon dioxide gas into the interstitial volume of the strand-blocked cable;
   b. next, injecting the compressed gas into the interstitial volume of the strand-blocked cable at a pressure that opens a continuous flow path along the entire length of the strand-blocked cable and expand the continuous flow path by altering the physical properties and/or structure of the PIB based strand-block mastic through which a rejuvenation fluid can be injected to treat the strand-blocked cable, the pressure being less than the elastic limit of the cable insulation;
   c. after the continuous flow path is formed by the injection of the compressed gas, depressurizing the entire length of the strand-blocked cable; and
   d. after depressurizing the entire length of the strand-blocked cable, injecting the rejuvenation fluid into the conductor strands of the strand-blocked cable along the continuous flow path at a pressure less than the elastic limit of the cable insulation.

17. The method of claim 16, where steps b and c are performed at least one additional time before performing step d.

* * * * *